Oct. 22, 1940.                F. KLEIN                2,219,105

DIVERTER VALVE

Filed Feb. 8, 1940

INVENTOR
FELIX KLEIN
BY
*Ennis Necho*
ATTORNEY

Patented Oct. 22, 1940

2,219,105

UNITED STATES PATENT OFFICE 2,219,105

DIVERTER VALVE

Felix Klein, Bayside, Long Island, N. Y., assignor to Keystone Brass & Rubber Co., Philadelphia, Pa., a corporation of Pennsylvania Application February 8, 1940, Serial No. 317,821

3 Claims. (Cl. 277—14)

My invention relates to a new and useful diverter valve of the type employed for selectively directing the flow of water through a spigot into a bathtub or the like or into a shower head or other outlet positioned above said spigot, and it relates more particularly to a diverter valve of this character which, unless positively manipulated for that purpose will at all times and automatically direct the flow of the water through the lower spigot thus preventing the water from flowing through the shower head or other higher outlet unless it is expressly desired to do so and unless the diverter valve is purposely adjusted to the proper position.

Plumbing fixtures of this general character now known and used have a diverter valve which remains in any given position to which it is set so that, unless the user is careful to examine the position of the valve, very cold or very hot water may accidentally flow through the shower thus causing inconvenience and injury. I am aware that diverter valves have been patented for the purpose I have in mind but I have found all such prior constructions to be unduly complicated and hence expensive to produce and maintain due to the necessity of various types of packings and other parts, and it is therefore the object of my invention to produce a type of diverter valve embodying my invention in a practical and inexpensive manner to render it practical for the universal market.

The construction and operation of my novel diverter valve will be more clearly understood from the following specification and the accompanying drawing in which;

Fig. 2 represents a view similar to Fig. 1 showing the diverter valve in the opposite position in which the water will flow upwardly through a shower head or the like.

Figure 1:
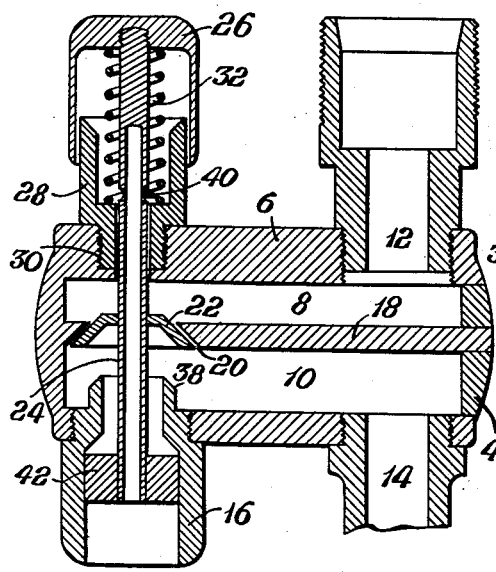
Fig. 1 represents a vertical sectional view through a diverter valve embodying my invention showing it in its normal and automatically assumed position in which the water will flow through a lower spigot.
Figure 2:
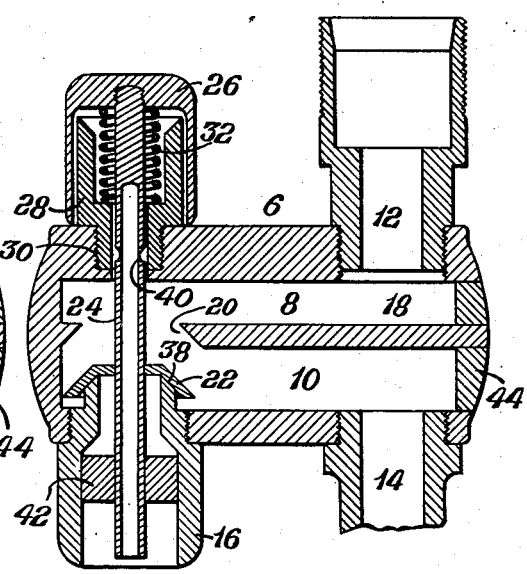
Figure 4:
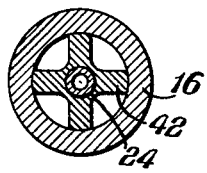
Fig. 4 represents a section on line 4—4 of Fig. 2.

Referring to the drawing in which like reference characters indicate like parts, and more particularly to Figs. 1 and 2, my novel diverter valve comprises a casing 6 in which are formed the upper and lower passages 8 and 10, the passage 8 communicating with the pipe or conduit 12 leading to a shower head while the passage 10 communicates at one end thereof with the pipe or conduit 14 which delivers cold or hot or a mixture of hot and cold water from a source of supply not shown, and at its other end the passage 10 communicates with a spigot 16. The passages 8 and 10 are separated by a partition 18 in which is formed the conical passage 20 which also forms a seat for the correspondingly shaped valve 22. The valve 22 is carried by the hollow stem 24, the upper end of which is attached to the cap 26 which slides upon the plug 28 which is secured to the casing 6 at 30. The plug 28 is hollowed in its upper portion so as to accommodate the spring 32 which tends, at all times, to raise the stem 24 and thus maintain the valve 22 in its uppermost position to block the flow of water from the passage 10 to the passage 8 and thus divert the water, unless otherwise adjusted, downwardly through the spigot 16. The tension of the spring 32 is so adjusted as to be somewhat less than the pressure of the water in the passage 10 so that, if the cap 26 is depressed to bring the valve 22 against the tapered seat 38 formed at the upper edge of the spigot 16 to close the latter, the pressure of water in the passage 10 will overcome the tension of the spring 32 and thus retain the parts in position as shown in Fig. 2 until the water is shut off from the conduit 14. Immediately upon the disappearance of pressure in the passage 10 the spring 32 automatically lifts the stem 24 and hence the valve 22 to the position shown in Fig. 1. As shown in Fig. 1, the valve 22 has been raised to its upper position by the spring 32 but it will be noted that it has not completely closed the valve opening 20, it being understood that the pressure of water in the passage 10 tends to raise the valve 22 still further until it fits tightly and completely closes the passage 20. It is within the scope of my invention to so adjust the spring 32 as completely to close the passage 20 when the parts are in the position shown in Fig. 1 so that the opening 20 is completely shut without the assistance of pressure of water in the passage 10.

In order to permit any water that may be in the conduit 12 to drain out through the spigot 16 even though the valve opening 20 is tightly closed, I have provided the hollow stem 24 with an opening or a series of openings 40 positioned along the stem 24 above the valve 22 and through which water in the passage 8 or the conduit 12 can pass downwardly through the hollow stem 24 and out through the spigot 16. The lower end of the stem 24 is guided in a central opening formed in the spider 42 which serves as an anti-splash when the water flows through the spigot 16.

By the use of my construction pattern work from which to make castings and the machining of castings is eliminated since the passages 8 and 10 as well as the openings for the conduits 12 and 14, the spigot 16, and the plug 28 can be drilled through a solid piece of metal 6 the ends of the passages 8 and 10 being closed by the wedged plug 44.

Figure 3:
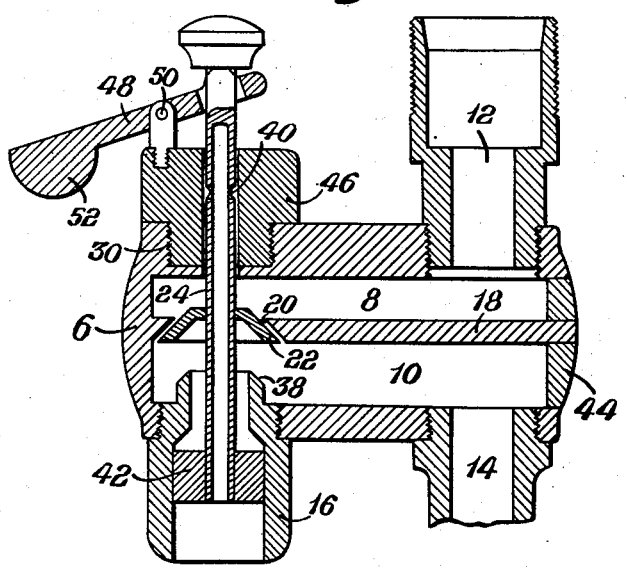
Fig. 3 represents a slightly modified form of construction.

In Fig. 3 I have shown a slightly modified form of construction in which, instead of the plug 28, I utilize the solid plug 46 and in which I eliminate the spring 32 by the use of the lever 48 fulcrumed at 50 and weighted at 52, the weight 52 being such as to be enough to raise the stem 24 only in the absence of pressure in the chamber 10 so that, if the construction of Fig. 3 is put in the position shown in Fig. 2, the valve 22 will remain in its lower position until the water pressure has been shut off from the conduit 14, whereupon the weight 52 will automatically raise the stem 24 to close the opening 20 and divert the water through the spigot 16.

Having thus described my invention, what I claim as new and desire to secure by Letters Patent is:

1. A device of the character stated comprising a casing, a pair of passages formed therein, one of said passages communicating with a source of water supply near one end thereof and with a discharge spigot near the other end thereof, a discharge conduit communicating with the other of said passages, there being a valve opening above said discharge spigot for establishing communication between said passages, a valve for closing said valve opening, a hollow stem carrying said valve and passing through said valve opening and extending into said discharge spigot, there being an opening through the wall of said hollow stem at a point above said valve, and a spring for normally urging said valve into a position for closing said valve opening, the tension of said spring being less than the pressure of water in said source of water supply.

2. A device of the character stated comprising a casing, a pair of passages formed therein, one of said passages communicating with a source of water supply near one end thereof and with a discharge spigot near the other end thereof, a discharge conduit communicating with the other of said passages, there being a conical valve opening above said discharge spigot for establishing communication between said passages, a conical valve for closing said valve opening, a hollow stem carrying said valve and passing through said valve opening and extending into said discharge spigot, there being an opening through the wall of said hollow stem at a point above said valve, and a spring for normally urging said valve into a position for closing said valve opening, the tension of said spring being less than the pressure of water in said source of water supply.

3. A device of the character stated comprising a casing, a lower horizontal passage formed therein, one end of said passage communicating with a source of supply and the other end thereof communicating with a discharge spigot, an upper horizontal passage formed in said casing parallel to said lower passage, there being a valve opening in the body of said casing above said discharge spigot for establishing communication between the juxtaposed ends of said upper and said lower passages, a conduit communicating with the other end of said upper passage, a hollow stem reciprocating vertically through the juxtaposed ends of said upper and lower passages, said valve opening and said discharge spigot, the inner end of said spigot forming a valve seat, a valve carried by said stem adapted selectively to close said spigot or said opening, there being a port through the wall of said stem at a point above said valve, and a spring for normally urging said valve into a position for closing said valve opening, the tension of said spring being less than the pressure of the water in said source of water supply.

FELIX KLEIN.